United States Patent [19]
Fujiwara et al.

[11] Patent Number: 5,866,059
[45] Date of Patent: *Feb. 2, 1999

[54] POLYCRYSTALLINE BCN SUBSTANCE AND METHOD OF PRODUCING SAME

[75] Inventors: Shuzo Fujiwara; Masatake Yoshida; Yozo Kakudate; Shu Usuba; Hiroyuki Yokoi; Katsutoshi Aoki, all of Tsukuba; Masayuki Kawaguchi; Tadayuki Kawashima, both of Ube; Katsuharu Kasami, Tokyo; Tamikuni Komatsu, Fuji, all of Japan

[73] Assignees: Central Glass Company, Limited, Yamaguchi Prefecture; Agency of Industrial Science and Technology, Tokyo; Asahi Kasei Kogyo Kabushiki Kaisha, Osaka, all of Japan

[*] Notice: This patent issued on a continued prosecution application filed under 37 CFR 1.53(d), and is subject to the twenty year patent term provisions of 35 U.S.C. 154(a)(2).

[21] Appl. No.: 682,234

[22] Filed: Jul. 17, 1996

Related U.S. Application Data

[63] Continuation of Ser. No. 143,898, Nov. 2, 1993, abandoned.

[30] Foreign Application Priority Data

| Nov. 6, 1992 | [JP] | Japan | 4-297073 |
| Oct. 27, 1993 | [JP] | Japan | 5-268859 |

[51] Int. Cl.$^6$ .............. B29C 43/56; C01B 35/00
[52] U.S. Cl. ............. 264/430; 264/84; 264/434; 264/649; 423/276
[58] Field of Search ............... 423/276; 264/430, 264/434, 84, 649

[56] References Cited

U.S. PATENT DOCUMENTS

| 2,941,248 | 6/1960 | Hall . | |
| 3,367,766 | 2/1968 | Barrington et al. | 264/434 |
| 3,876,751 | 4/1975 | Alexeevsky et al. | 264/434 |
| 4,187,083 | 2/1980 | Wedlake et al. | 423/276 |
| 4,483,836 | 11/1984 | Adadurov et al. . | |
| 4,695,321 | 9/1987 | Akashi et al. | 264/434 |

FOREIGN PATENT DOCUMENTS

| 38-14 | 9/1959 | Japan . | |
| 55067570 | 11/1978 | Japan . | |
| 55-37570 | 5/1980 | Japan . | |
| 58-120505 | 7/1983 | Japan . | |
| 01292823 | 5/1988 | Japan . | |
| 02145263 | 11/1988 | Japan . | |
| 1-252519 | 10/1989 | Japan . | |
| 252519 | 10/1989 | Japan | 423/276 |
| 252520 | 10/1989 | Japan | 423/276 |
| 316460 | 12/1989 | Japan | 423/276 |
| 126614 | 5/1991 | Japan | 423/276 |

OTHER PUBLICATIONS

Gypsum & Lime No. 219 (1989).

Chem. Mater. 1993 vol. 5, pp. 695–699.

Mat.Res.Bull., vol. 16, pp. 1385–1393 (1981).

*Primary Examiner*—Wayne Langel
*Attorney, Agent, or Firm*—Evenson, McKeown, Edwards & Lenahan, P.L.L.C.

[57] ABSTRACT

In order to produce a new substance having a diamond crystal structure, the following steps are taken in order. First, a graphite-like substance is prepared which contains boron (B), carbon (C) and nitrogen (N) as main elements. Then, the graphite-like substance is mixed with a metal powder to produce a mixture. Then, a pressure is applied to the mixture to produce a molded body, and then an explosion pressure is applied to the molded body.

23 Claims, 2 Drawing Sheets

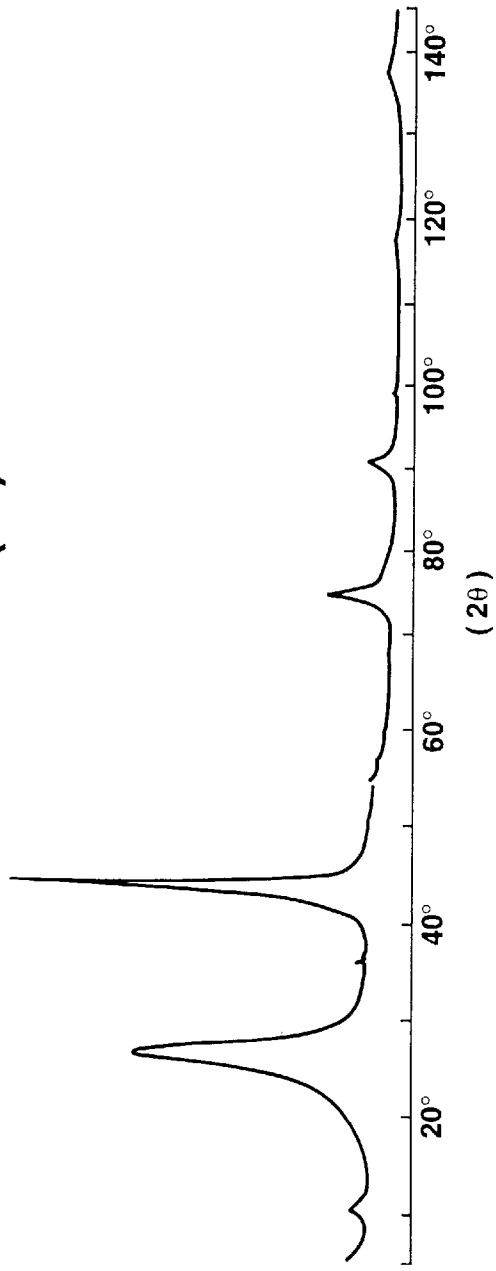

5,866,059

POLYCRYSTALLINE BCN SUBSTANCE AND METHOD OF PRODUCING SAME

This is a continuation application of Ser. No. 08/143,898, filed on Nov. 2, 1993, now abandoned.

BACKGROUND OF THE INVENTION

1. Field of the Invention

The present invention relates in general to artificial substances having a structure of diamond crystal and methods for producing the same, and more particularly to a method of artificially producing substances (which will be referred to as "c-BCN" hereinafter), which have a structure of diamond crystal, by applying dynamic high pressure to graphite or graphite-like subsance (which will be referred to as "h-BCN" hereinafter) which is composed of boron (B), carbon (C) and nitrogen (N) as main elements.

2. Description of Prior Art

As is known, both diamond and boron nitride of tesseral system (which will be referred to as c-BN hereinafter) having a crystal structure similar to that of the diamond are extremely hard and thus commonly applied to the manufacture of abrasive materials and cutting tools which are indispensable to the industrial field. Besides, in recent years, some of these substances have been used as the material for semiconductors. Although the diamond is the hardest substance, it is oxidized in oxidative atmosphere of high temperature as is known from the fact that it burns in air. Furthermore, the diamond has a tendency to be eroded when it is in contact with by any of materials of the group VIII elements or with alloys containing the metal such as iron, nickel or cobalt. Although the Vickers hardness is about a half of that of diamond, the c-BN does not have the above-mentioned drawbacks possessed by the diamond. Thus, in recent years, the c-BN has been taken notice of the material particularly applicable for the abrasive materials and cutting tools for ironwork.

Accordingly, if c-BCN substance of tesseral system (viz., a substance in which a part of crystal lattice in diamond is substituted with some boron (B) and nitrogen (N)) can be produced, the substance is expected to possess both the mechanical strength of the diamond and the chemical stability of the c-BN. That is, the substance is expected to be epock-making highly strong material.

Hitherto, for synthesizing the c-BCN substances of such tesseral system, various methods have been proposed and put into practical use. One is a method in which a h-BCN substance of hexagonal system is treated statically at temperature of 3600° C. and pressure of 14 GPa (A. R. Badzian, Mater, Res, Bull., 16 (1981) 1385)). One is a method in which a h-BCN powder of hexagonal or amorphous system is mixed with a bit of metal of iron family elements and sintered under superhigh pressure and temperature (Japanese Patent First Provisional Publication 55-67570). In this method, an installation disclosed in Japanese 38-14 was used. One is a method in which a h-BCN substance containing only 0.02 to 2.0% carbon is treated at temperature of 1300° to 1600° C. and pressure of 4 to 6 GPa (Japanse Patent First Provisional Publication 58-120505). One is a method in which a h-BCN substance of hexagonal or amorphous system is treated with a solvent at temperature higher than 1300° C. and pressure higher than 5 GPa (Japanese Patent First Provisional Publication 61-24328). In this method, a device disclosed in U.S. Pat. No. 2,941,248 was used. One is a method in which a h-BCN substance of hexagonal system is statically treated at pressure of 14 GPa and temperature of 3300° C. and one is a method in which a h-BCN substance of hexagonal system is treated statically at pressure of 7.5 GPa and high temperature using, as catalyst, a metal of iron or aluminium family elements (Takayoshi SASAKI, Yoshinori FUJIKI, "Gypsum & Lime" No. 219, P45–50, 1989).

In addition to the above-mentioned methods, various attempts have been also carried out for production of the c-BCN substances by using a solvent under a condition of high pressure and high temperature.

One attempt (T. Sasaki et al., Chem. Mater. 5 ,1993, 695) revealed however that a c-BCN substance produced by statically treating a h-BCN substance together with a cobalt solvent at pressure of 5.5 GPa and temperature of 1400° to 1600° C. was just a mixture of diamond and c-BN susbstance. That is, it has been revealed that a desired c-BCN substance of tesseral system can not be produced under the static high pressure. This is because an essential problem which should be solved when synthesizing substances which are not present in the natural world is not solved by such static high pressure and high temperature treatment. It is considered that, under equilibrium condition of such process, separation of diamond and c-BN is natural in thermodynamic point of view.

SUMMARY OF THE INVENTION

In view of the above, the applicants carried out various examinations and tests and finally found a unique method of producing c-BCN substances of tesseral system from h-BCN substances. That is, for producing the c-BCN substance of teseral system, a dynamic high pressure is applied to h-BNC substance by means of strong shockwave.

The new c-BCN substance provided by the present invention is a polycrystalline substance (which will be referred to as "polycrystalline BCN substance" hereinafter) in which particulates of diamond crystal structure, composed of boron (B), carbon (C) and nitrogen (N) as main elements, are bonded to one another in various directions. The composition formula of the polycrystalline BCN substance is represented by "Bx Cy Nz".

It is to be noted that the expression "diamond crystal structure" used in the specification means a crystal lattice of tesseral system (or cubic system) having the boron (B), carbon (C) and nitrogen (N) elements set in the lattice points. The "x:y:z" of the composition formula of the polycrystalline BCN substance may take any ratio. However, preferably, the ratio of "x:z" is 1:1 and in this ratio, the value of "y" should satisfy the inequality of "$0.1 \leq y \leq 10$". That is, if the value of "y" is smaller than 0.1, the synthesized BCN substance tends to show a hardness poorer than the c-BN, while, if the value "y" is greater than 10, the synthesized BCN substance tends to show heat and chemical resistance poorer than the diamond. More preferably, in the ratio wherein the "x:z" is 1:1, the value of "y" should satisfy the inequality of "$0.5 \leq y \leq 4$". In this case, in the diamond crystal structure, the boron (B) and nitrogen (N) elements are bonded to different elements, and the carbon (C) elements are bonded to the boron (B), carbon (C) and nitrogen (N) elements, so that the synthesized BCN substance can possess both the advantage of the c-BN and that of the diamond.

The polycrystalline BCN substance provided by the present invention is not a mixture of the c-BN and the diamond, but a new substance. This was proved from the following fact obtained from many examinations.

Through the examinations, it was found that the lattice constant of the BCN substance provided by the invention was within a range between that (about 3.568 Å) of the diamond and that (about 3.615 Å) of the c-BN. When the relationship between the composition rate and the lattice constant was plotted in a graph representing the rate "x" by the axis of abscissas and the lattice constant by the axis of ordinate, the relation curve thus plotted had a convex top. It was obserbed that the relationship thus obtained was quite different from that expected from the "Vergard's law" (L. Vergard, Z. Phys., 5 (1921) 17).

It is to be noted that the BCN substance produced by "Badzian" as mentioned hereinabove is described to comply with the Vergard's law. This means that the polycrystalline BCN substance of the present invention is different from the substance of "Badzian". As a result of NMR (nuclear magnetic resonance) analysis by which spectral characteristics of $^{13}C$ and $^{11}B$ were examined, it was found that three types of $SP^3$-bonding carbons and $SP^3$-bonding boron were present in the BCN substance of the invention. This proves that the BCN substance of the invention is not the mixture of diamond and c-BN substance.

The BCN substance provided by the invention is a polycrystalline substance composed of crystallized particulates of diamond structure. Each particulate is shaped spherical. Examination using an electron microscope and an electron diffraction analyzing device revealed that the particulates were each about 10 to 1000 Å in size. The polycrystalline substance composed of such-sized particulates can exhibit excellent effect as an abrasive material for silicone wafer.

The BCN substance provided by the invention is chemically stable. While the diamond burnt at 600° C. in air, the BCN substances of the invention did not show any reaction even when heated up to that tempeature in air.

According to the present invention, there is provided a polycrystalline BCN substance which includes particulates of diamond crystal structure, each particulate being composed of boron (B), carbon (C) and nitrogen (N) as main elements.

According to the present invention, there is provided a method of synthesizing a substance of diamond crystal structure by applying dynamic high pressure to a graphite-like substance (viz., h-BCN) which is composed of, as main elements, boron (B), carbon (C) and nitrogen (N). The starting raw materials in the invention are h-BCN substances.

According to the present invention, there is provided a method of producing a substance of a diamond crystal structure. The method comprises by steps (a) preparing a graphite-like substance composed of boron (B), carbon (C) and nitrogen (N) as main elements; (b) mixing the graphite-like substance with a metal powder; (c) applying a pressure to the mixture to produce a molded body; and (d) applying dynamic pressure by shockwave to the molded body.

According to the present invention, there is provided a method of producing a substance which has a diamond crystal structure. The method comprises by steps (a) treating boron trichloride, acetylene and ammonia at a given high temperature to produce a graphite-like substance in the form of powder, the substance being composed of boron (B), carbon (C) and nitrogen (N) in the ratio of 1.0:1.3:1.0 and about 2.4% of hydrogen (H); (b) mixing the graphite-like substance with a copper powder in the ratio of 10:90 in weight to provide a mixture, the copper powder being substantially consisted of scaly copper particles whose means diameter is about 0.05 mm; (c) pressing the mixture to produce a molded body until whose density reaches about 70% of the theoretical density; (d) applying dynamic pressure of about 27 GPa by shockwave to the molded body.

According to the present invention, there is provided a method of producing a substance which has a structure of diamond crystal. The method comprises by steps (a) treating boron trichloride, acetylene and ammonia at a given high temperature to provide a graphite-like substance in the form of powder, the substance being composed of boron (B), carbon (C) and nitrogen (N) in the ratio of 1.0:1.3:1.0 and about 2.4% of hydrogen (H); (b) mixing the graphite-like substance with a copper powder in the ratio of 96:4 in weight to provide a mixture, the copper powder being substantially consisted of spherical copper particles whose mean diameter is about 0.1 mm; (c) pressing the mixture to provide a molded body; and (d) applying dynamic pressure of about 35 GPa by explosion shockwave to the molded body.

According to the present invention, there is provided a method of producing a substance which has a structure of diamond crystal. The method comprises by steps (a) treating boron trichloride and acetonitrile at about 1000° C. and at about 1500° C. to produce a black solid substance, the black solid substance including boron (B), carbon (C) and nitrogen (N) in the ratio of 1.0:2.5:1.0 in weight and about 2% of hydrogen (H); (b) mixing the black solid substance with a copper powder in the ratio of 96:4 in weight to provide a mixture, the copper powder substantially consisting of spherical copper particles whose mean diameter is about 0.1 mm; (c) pressing the mixture to provide a molded body; and (d) applying dynamic pressure of about 35 GPa by explosion shockwave to the molded body.

According to the present invention, there is provided a method of producing a substance which has a diamond crystal structure. The method comprises by steps: (a) mixing an equimolar gas of acetonitrile and boron trichloride with a small amount of hydrogen gas; (b) heating the mixture at 1000° to 1500° C. to produce a black solid substance, the B:C:N ratio of the substance being 1.0:1.0:1.0; (c) mixing black solid substance with a copper powder in the ratio of 96:4 in weight to produce a mixture, the copper powder substantially consisting of spherical copper particles whose mean diameter is about 0.1 mm; (d) pressing the mixture to produce a molded body; and (e) applying an explosion pressure of about 35 GPa to the molded body.

The graphite-like substances used as a starting raw material of this invention are described in detail in Japanese Patent First Provisional Publication 1-252519. That is, for production of one graphite-like substance, boron trichloride and acetonitrile are mixed under a given condition to produce a solid substance, and the solid substance is heated at a temperature higher than 500° C., preferably at about 1500° C. Another graphite-like substance described in the publication is produced by treating boron trichloride, hydrocarbon such as acetylene and nitrogen impregnated gas such as ammonia at a given high temperature.

However, the starting raw material is not limited to the substances shown in the publication. That is, any kind of graphite-like substances is applicable in the invention so long as it is composed of boron (B), carbon (C) and nitrogen (N), as main elements.

Usually, the h-BCN is in the form of fine particles or particulates whose mean diameter is smaller than 0.1 mm. For the starting raw material in the invention, the h-BCN powder, preferably with addition of metal powder of 50 to 98% in weight, is put in a metallic container and compressed therein to make a molded body of h-BCN whose density is greater than 40% of the theoretical density. The added metal powder contributes to increase the pressure effect which arises from application of explosion pressure mentioned below and to suppress undesired reverse conversion from the produced diamond crystal substance to the starting material, which would occur due to a residual heat after application of the explosion pressure.

As a material of the metal powder, copper, aluminium, cobalt, nickel, tungsten or alloys of them is applicable, which has an impact resistance greater than that of the graphite-like substance. Among them, copper is the best material because it rarely produces carbides. The mean diameter of the metal particles is smaller than 0.5 mm, preferably, within a range from 0.1 mm to 0.01 mm. The shape of each particle is spherical and not flat, preferably.

BRIEF DESCRIPTION OF THE DRAWINGS

Advantages as well as other objects of the present invention will become apparent from the following description when taken in conjunction with the accompanying drawings, in which:

FIG. 3A is a pattern of X-ray diffraction obtained from a sample which is produced by the method of the present invention, that is, a sample subjected to a so-called "shock conversion treatment"; and FIG. 3B is a pattern of X-ray diffraction obtained from a reference sample which is not subjected to the "shock conversion treatment".

DEVICES FOR CARRYING OUT THE INVENTION

Figure 1:
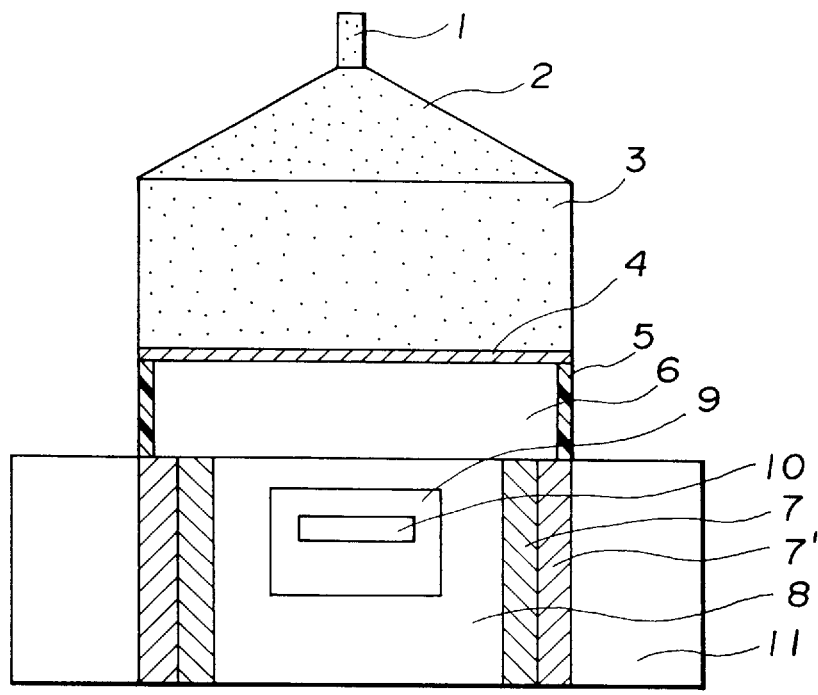
FIG. 1 is a sectional view of a shock application device of flat type used for executing the method of the present invention.
Figure 2:
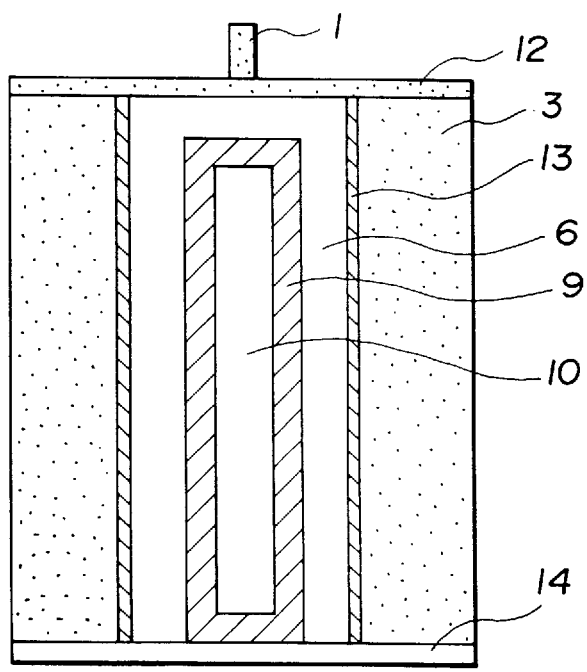
FIG. 2 is a sectional view of a shock application device of cylindrical type which can be also used for executing the method of the present invention.

In FIGS. 1 and 2, there are shown two conventional shock application devices which can be used for carrying out the method of the present invention. The device shown in FIG. 1 is called "flat type", while, the device shown in FIG. 2 is called "cylindrical type".

In the flat type device of FIG. 1, when a blasting cap 1 is exploded, a detonation wave generator 2 is energized to induce explosion of a main explosive 3. Thus, a plane detonation wave is generated and rapidly advanced downward, so that a metallic plate 4 is forced to fly downward in a space 6 along a plastic tube 5. When the metallic plate 4 collides against a container holder 8, a shock wave is advanced downward in the container holder 8 and applied, through a sample container 9, to a sample 10. Numerals 7 and 7' denote concentrically arranged steel tubes which are enclosed by a thicker ring 11. The ring 11 is made of heavy metal, such as lead or the like. The steel tubes 7 and 7' and the thicker ring 11 constitute a so-called "momentum trap". As is known, for protection of the sample container 9 from the explosion, the momentum trap itself is smashed into fragments to absorb the momentum generated by the explosion. If the explosion pressure of the main explosive 3 is expected sufficiently large, the metal plate 4 may be omitted. In this case, the main explosive 3 is directly placed on the container holder 8.

In the cylindrical type device of FIG. 2, when a blasting cap 1 is exploded, an explosive sheet 12 is energized to induce a symmetrically balanced explosion of a main explosive 3, that deforms a metal tube 13 inwardly and causes it to collide against a sample container 9 to generate a shock wave. The shock wave compresses a sample 10 in the container 9. Designated by numeral 14 is a holding plate for the device. For the same reason described hereinabove, the metal tube 13 may be omitted.

DETAILED DESCRIPTION OF THE EMBODIMENTS

As will be described hereinafter, four examples of the polycrystalline substance were produced by executing the method of the present invention. These examples were examined by means of a transmission type electron microscope (NIPPON DENSHI:JEM-4000FX), an X-ray diffraction analyzer (Philips: PW1800), and a nuclear magnetic resonance analyzer (Brucker: MSL400P).

The acceleration voltage of the electron microscope was 400 KV.

The operating conditions of the nuclear magnetic resonance analyzer were as follows:

Condition-1

Object to be measured: 13C-NMR
Probe: 7 mmMAS
Pulse sequence: QUADCYCL
Frequency to be measured: 100.614 MHz ($^{13}$C)
Data size: 8K
Frequency range to be observed: 83 KHz
Cycling time: 30 sec
Exciting pulse width: 4.5 $\mu$sec (90° pulse)
Dead time: 10 $\mu$sec
Data uptaking time: 12.288 msec
MAS: 4000–4900 Hz
Temperature: Room temp.
Chemical shift reference: C=0 peak of glycine (176.46 ppm)

Condition-2

Object to be measured: $^{11}$B-NMR
Probe: 4 mmMAS
Pulse sequence: QUADCYCL
Frequency to be measured: 128.33 MHz ($^{11}$B)
Data size: 8K
Frequency range to be observed: 26 KHz
Cycling time: 30 sec
Exciting pulse width: 1.0 $\mu$sec
Dead time: 30 $\mu$sec
Data uptaking time: 38.912 msec
MAS: 6000 Hz
Temperature: Room temp.
Chemical shift reference: $BO_4$ peak of Borax ($Na_2B_4O_7.10H_2O$)(2.0 ppm)

REFERENCE SAMPLES

For comparison, reference samples were also examined, which were diamond and boron nitride of tesseral system.

COMPOSITION FORMULA DETERMINED BY ELEMENTARY ANALYSIS

The composition formula of each c-BCN substance was determined by means of the following elementary analyzing method.

That is, as to the quantitative analysis of the cabon (C), nitrogen (N) and hydrogen (H), each sample was mixed with lead oxide (Pb3O4) and put into a tin capsule. After being folded, the tin capsule was exposed to an environment of oxygen at temperature of 800° to 1000° C. to produce carbon dioxide gas, nitrogen gas and aqueous vapour which were led into a gas chromatograph. As to the quantitative analysis of the boron (B), each sample (0.1 g) was mixed with 1 g of potasium carbonate and 1 g of sodium carbonate, and the mixture was put in a platinum bowl and fully melted by a gas burner. After being heated for about 30 minutes, the melted sample was cooled to the level of room temperature, and then mixed with hydrochloric acid and distilled water. The water solution thus produced was led into a high frequency induction plasma mass spectrograph (ICP mass analysis) for the analysis of the boron (B). The examination was carried out three times in each sample, and the composition formula was determined from the mean value of the three data.

EXAMPLES (Example-1)

By treating boron trichloride, acetylene and ammonia at a high temperature, a graphite-like substance in the form of powder was produced. An elemental analysis applied to this powdered substance showed that the ratio of boron (B), carbon (C) and nitrogen (N) is 1.0:1.3:1.0 and the substance contains about 2.4% of hydrogen (H). As a result of X-ray analysis applied to the powdered substance, it was found that the substance shows a strong diffraction peak (viz., the peak caused by the 0, 0, 2 surface) which is characteristic of a graphite structure.

The powdered substance and a copper powder were mixed in the ratio of 10:90 in weight. The copper powder was substantially consisted of scaly copper particles whose mean diameter was 0.05 mm. The mixture was then put in a molding die and pressed to produce a discal molded body whose diameter was about 20 mm and thickness was about 5 mm. The density of the molded body was about 70% of the theoretical density.

The molded body, viz., a sample 10, was subjected to the shock conversion treatment using the device of FIG. 1. In the experiment, about 200 g of main explosive 3 was used. The explosive was produced by mixing cyclomethylene-tetra-nitoramine and 66% solution of sodium perchlorate in the ratio of 85:15. The metal plate 4 used in this case was 76 mm in diameter and 3 mm in thickness. The sample container 9 was made of stainless steel and 20 mm in inner diameter, 30 mm in outer diameter and 20 in height. The container holder 8 enclosing the sample container 9 was made of brass and was 30 mm in inner diameter, 50 mm in outer diameter and 40 mm in height. Around the container holder 8, there were arranged the steel tubes 7 and 7' and the thicker lead ring 11, as shown in the drawing.

In this example, it was expected that the explosion pressure applied to the sample 10 was about 27 GPa. After the explosion process, the sample container 9 was put out from the broken device and the sample 10 was taken out from the container 9 by using a special tool. Then, nitric acid and hydrochloric acid were added to the sample to solve metallic parts in the sample, and then insoluble matters were separated and dried. Finally, a black powder was obtained.

The property of the black powder thus produced was examined by means of X-ray diffraction analysis. As a result of this examination, it was found that the powder has a strong diffraction peak at the position (viz., wave length) where the diamond of tesseral system should have its diffraction peak (viz., the peak caused by the 1, 1, 1 surface).

By comparing the strength of this peak with that of a corresponding peak possessed by a reference sample which was not subjected to the shock conversion treatment, it was found that diamond-like substance (viz., c-BCN) is present by about 5% in the black powder.

(Example-2)

The powdered graphite-like substance as mentioned in Example-1 and a copper powder were mixed in the ratio of 96:4 in weight. The copper powder was substantially consisted of spherical copper particles whose mean diameter was 0.1 mm. From the mixture, a discal molded body as a sample 10 was produced.

Like in the case of Example-1, the discal molded body was subjected to the shock conversion treatment using the device of FIG. 1. While, in Example-2, the amount of the main explosive 3 was about 260 g.

In this example, it was expected that the explosion pressure applied to the sample 10 is about 35 GPa. After the explosion, substantially the same process as n the former case was carried out to obtain a black powder.

As a result of X-ray diffraction analysis applied to the black powder, it was found that diamond-like substance (viz., c-BCN) is present by about 20% in the black powder.

(Example-3)

By treating boron trichloride and acetonitrile at 1000° C., a solid substance was produced. Then the solid substance was heated to 1500° C. to obtain a black solid substance. An elemental analysis applied to this substance showed that the ratio of boron (B), carbon (C) and nitrogen (N) is 1.0:2.5:1.0 and the substance contains about 2% of hydrogen (H). As a result X-ray analysis, it was found that the substance has a diffraction peak which is characteristic of a graphite structure, as is seen from the pattern of FIG. 3(B).

By carrying out substantially the same shock conversion treatment as in Example-2 on the substance, a black powder was finally obtained. When two glass plates were rubbed against each other with the black powder inserted therebetween, it was found that many streaks or scratches were produced on the surfaces of the glass plates.

As a result of X-ray analysis applied to the black powder, it was found that the powder shows both a strong diffraction peak at the position where the diamond of tesseral system shows its diffraction peak and a diffraction peaks of the remaining graphite-like substance.

By comparing the strength of these peaks with those possessed by a reference sample which was not subjected to the shock conversion treatment, it was found that c-BCN was present by about 50 to 60% in the black powder (see FIG. 3(A)). By applying known separation and purification processes to the powder, a high purity c-BCN substance was obtained. The elementary analysis revealed that the composition formula of this substance was $B_{1.0} C_{2.8} N_{1.0}$.

The C-BCN substance was in the form of powder and dark blue. As a result of the X-ray diffraction analysis, it was found that the c-BCN substance had a structure of diamond crystal with a spacing as described hereinbelow, which spacing is different from that of the diamond and that of the boron nitride of cubic system.

The lattice constant a=3.605±0.001 Å

| hkl | spacing d(Å) | ratio of inensity |
|-----|--------------|-------------------|
| 111 | 2.083 | 100 |
| 200 | 1.809 | 0.5 |
| 220 | 1.276 | 24 |
| 311 | 1.088 | 13 |
| 400 | 0.901 | 5 |
| 431 | 0.827 | 12 |

As a result of the examination by the transmission type electron microscope (TEM), it was found that the c-BCN substance was a polycrystalline substance of a structure wherein particulates of diamond crystal structure were bonded to one another in various directions. The particulates were about 50 to about 500 Å (angstrom) in size.

As a result of the nuclear magnetic resonance analysis by which spectral characteristics of $^{13}C$ and $^{11}B$ were examined, it was found that three types of $SP^3$-bonding carbons (chemical shift: 37.016 ppm, 44.354 ppm & 55.253 ppm) and $SP^3$-bonding boron (chemical shift: 1.332 ppm) were present in the substance of the invention.

(Example-4)

An equimolar gas of acetonitrile and boron trichloride was mixed with a small amount of hydrogen gas and heated in a reactor at 1000° to 1500° C. With this, a black graphite-like substance was produced. It was found that the ratio of B:C:N of this h-BCN substance was 1.0:1.0:1.0. By carrying out similar operation to that in the above-mentioned Example-2 using the h-BCN substance as a starting material, a black powder was finally obtained. By applying known separation and purification processes to the powder, a high purity c-BCN was obtained in the yield of 30%. The elementary analysis revealed that the composition formula of the c-BCN was substantially the same as that of the starting material. The blueness of the c-BCN was stronger than that of the Example-3. As a result of the X-ray diffraction analysis, it was found that c-BCN substance had a structure of diamond crystal and had a lattice constant within a range between those of the boron nitride of cubit system and the c-BCN substance of Example-3.

As for chemical stability, the diamond burnt at 600° C. in air, while, the c-BCN substances of Example-3 and -4 did not show any reaction even when heated up to that temperature in air.

As is described in the foregoing description, according to the present invention, there are provided both a new polycrystalline BCN substance and a method of producing the same. In fact, the new polycrystalline BCN substance comprises particulates of diamond crystal structure, each particulate being composed of boron (B), carbon (C) and nitrogen (N) as main elements. The new substance has been proved to have both the mechanical strength of the diamond and the chemical stability of the boron nitride of tesseral system. Thus, the new material is widely applicable not only to the manufacture of abrasive materials and cutting tools which are indispendable to the industrial field but also to the manufacture of semiconductors.

What is claimed is:

1. A method of producing a BCN structure which has a diamond crystal structure, comprising the steps of:
   (a) preparing a substance having a hexagonal or powder structure which contains boron (B), carbon (C) and nitrogen (N) as main elements;
   (b) mixing said substance with a metal powder to produce a mixture;
   (c) applying a pressure to said mixture to produce a molded body; and
   (d) applying an explosion pressure to said molded body.

2. A method as claimed in claim 1, in which material of said metal powder is a member selected from the group consisting of copper, aluminum, cobalt, nickel, tungsten and alloys thereof.

3. A method as claimed in claim 2, in which said metal powder comprises about 50% to 98% of the mixture by weight.

4. A method as claimed in claim 3, in which said molded body has a density greater than 40% of a true density.

5. A method as claimed in claim 1, in which a mean diameter of part by said metal powder is smaller than 0.5 mm.

6. A method as claimed in claim 5, in which a mean diameter of said particles of said metal powder is within a range from 0.1 mm to 0.01 mm.

7. A method as claimed in claim 6, in which each of said particles of said metal powder is shperical in shape.

8. A method as claimed in claim 1, in which, in the step (d), the explosion pressure applied to said molded body is about 27 GPa to 35 GPa.

9. A method as claimed in claim 8, in which the explosion pressure is produced by exploding an explosive which is produced by mixing cyclomethylene-tetra-minoramine and 66% solution of sodium perchlorate in a ratio of 85:15.

10. A method as claimed in claim 1, in which said substance contains boron (B), carbon (C) and nitrogen (N) in a ratio of 1.0:1.3:1.0 and contains 2.4% of hydrogen (H).

11. A method as claimed in claim 10, in which the substance is a powder and is produced by treating boron trichloride, acetylene and ammonia at an elevated temperature.

12. A method as claimed in claim 1, in which said substance contains boron (B), carbon (C) and nitrogen (N) in a ratio of 1.0:2.5:1.0 and contains 2% of hydrogen (H).

13. A method as claimed in claim 12, in which the substance is produced by treating boron trichloride and acetonitrile at 1000° C. and then at 1500° C.

14. A method as claimed in claim 1, in which said substance and said metal powder are mixed in a ratio of 10:90 in weight.

15. A method of producing a BCN alloy which has a diamond crystal structure, comprising the steps of:
   (a) preparing a substance having a hexagonal or powder structure which contains boron (B), carbon (C) and nitrogen (N) as main elements;
   (b) mixing said substance with a metal powder to produce a mixture;
   (c) applying a pressure to said mixture to produce a molded body; and
   (d) applying an explosion pressure to said molded body, wherein said substance and said metal powder are mixed in a ratio of 10:90 in weight, and said metal powder is a copper powder.

16. A method as claimed in claim 15, in which said copper powder consists essentially of scaly copper particles having a mean diameter of about 0.05 mm.

17. A method as claimed in claim 16, in which the density of said molded body is about 70% of the theoretical density.

18. A method as claimed in claim 15, in which said substance and said copper powder are mixed in a ratio of 96:4 in weight.

19. A method as claimed in claim 18, in which said copper powder consists essentially of spherical copper particles having a mean diameter of about 0.1 mm.

20. A method of producing a BCN structure which has a diamond crystal structure, comprising the steps of:
   (a) treating boron trichloride, acetylene and ammonia at a high temperature to produce a substance which is a powder, the substance including boron (B), carbon (C) and nitrogen (N) in a ratio of 1.0:1.3:1.0 and about 2.4% of hydrogen (H);
   (b) mixing the substance with a copper powder in a ration of 10:90 by weight to produce a mixture, said copper powder consisting essentially of scaly copper particles having a mean diameter of about 0.05 mm;
   (c) compressing said mixture to produce a molded boy having a density of about 70% of the true density;
   (d) applying an explosion pressure of about 27 GPa to said molded body.

21. A method of producing a BCN alloy which has a diamond crystal structure, comprising the steps of:
   (a) treating boron trichloride, acetylene and ammonia at a high temperature to produce a substance which is a powder, the substance including boron (B), carbon (C) and nitrogen (N) in a ratio of 1.0:1.3:1.0 and about 2.4% of hydrogen (H);
   (b) mixing the substance with a copper powder in a ratio of 96:4 by weight to produce a mixture, said copper powder consisting essentially of spherical copper particles having a mean diameter of about 0.1 mm;
   (c) compressing said mixture to produce a molded body; and
   (d) applying an explosion pressure of about 35 GPa to said molded body.

22. A method of producing a BCN structure which has a diamond crystal structure, comprising the steps of:
   (a) treating boron trichloride and acetonitrile at about 1000° C. and at about 1500° C. to produce a black solid substance, said black solid substance including boron (B) carbon (C) and nitrogen (N) in a ratio of 1.0:2.0:1.0 in weight and about 2% of hydrogen (H);
   (b) mixing the black solid substance with a copper powder in a ratio of 96:4 in weight to produce a mixture, said copper powder consisting essentially of spherical copper particles whose mean diameter is about 0.1 mm;
   (c) pressing said mixture to produce a molded body;
   (d) applying an explosion pressure of about 35 GPa to said molded body.

23. A method of producing a substance which has a diamond crystal structure, comprising the steps of:
   (a) mixing an equimolar gas composition of acetonitrile and boron trichloride with hydrogen gas;
   (b) heating the gas mixture at 1000° to 1500° C. to produce a black solid substance, the B:C:N ratio of said substance being 1.0:1.0:1.0;
   (c) mixing the black solid substance with a copper powder in a ratio of 96:4 by weight to produce a solid mixture, said copper powder consisting essentially of spherical copper particles having a mean diameter of about 0.1 mm;
   (d) pressing said solid mixture to produce a molded body; and
   (e) applying an explosion pressure of about 35 GPa to said molded body.

* * * * *